(12) United States Patent
Fathi et al.

(10) Patent No.: US 11,698,058 B1
(45) Date of Patent: Jul. 11, 2023

(54) MULTI-SOURCE SUSTAINABLE-RENEWABLE ENERGY HARVESTER

(71) Applicant: STC Rainforest Innovations, Albuquerque, NM (US)

(72) Inventors: Nima Fathi, Albuquerque, NM (US); Peter V. Vorobieff, Albuquerque, NM (US); Patrick McDaniel, Albuquerque, NM (US); Seyed Sobhan Aleyasin, Willipeg (CA); Mahyar Pourghasemi, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 0 days.

(21) Appl. No.: 17/666,489

(22) Filed: Feb. 7, 2022

Related U.S. Application Data

(60) Provisional application No. 63/146,475, filed on Feb. 5, 2021.

(51) Int. Cl.
 *F03G 6/04* (2006.01)
 *F24S 20/61* (2018.01)
 *F02C 1/05* (2006.01)

(52) U.S. Cl.
 CPC .............. *F03G 6/045* (2013.01); *F02C 1/05* (2013.01); *F24S 20/61* (2018.05)

(58) Field of Classification Search
 CPC ............. F03G 6/045; F02C 1/05; F24S 20/61
 USPC .......................................... 60/641.8–641.15
 See application file for complete search history.

(56) References Cited

U.S. PATENT DOCUMENTS

| | | | | |
|---|---|---|---|---|
| 5,771,265 | A * | 6/1998 | Montazer | G21H 1/00 376/273 |
| 5,983,634 | A * | 11/1999 | Drucker | F03D 9/37 60/641.15 |
| 9,038,385 | B1 * | 5/2015 | Khim | F03D 80/70 60/698 |
| 10,006,443 | B1 | 6/2018 | Vorebieff et al. | |
| 2009/0288410 | A1 * | 11/2009 | Wolter | F03G 6/003 60/517 |
| 2011/0061295 | A1 * | 3/2011 | McAlister | F02B 43/08 47/17 |
| 2011/0302921 | A1 * | 12/2011 | Ferguson | F02C 1/05 60/644.1 |
| 2015/0107243 | A1 * | 4/2015 | Parrella, Sr. | F03D 13/20 60/641.2 |
| 2015/0122244 | A1 * | 5/2015 | Bain | F24S 40/10 126/643 |

OTHER PUBLICATIONS

US Energy Facts Explained, US Energy Information Administration, https://www.eia.gov/energyexplained/?page=us_energy_home; at least as early as Oct. 30, 2018.

Solomon, Susan, et al. "Contributions of stratospheric water vapor to decadal changes in the rate of global warming." Science 327.5970 (2010): 1219-1223.

(Continued)

*Primary Examiner* — Hoang M Nguyen

(74) *Attorney, Agent, or Firm* — Keith Vogt, Ltd.; Keith A. Vogt

(57) ABSTRACT

A method, approach, system, apparatus and solution that generates electricity from the removal heat of sustainable thermal cycles combined with a renewable thermal energy source.

1 Claim, 9 Drawing Sheets

(56) References Cited

OTHER PUBLICATIONS

Fathi, Nima, Patrick McDaniel, Seyed Sobhan Aleyasin, Matthew Robinson, Peter Vorobieff, Sal Rodriguez, and Cassiano de Oliveira. "Efficiency enhancement of solar chimney power plant by use of waste heat from nuclear power plant." Journal of Cleaner Production 180 (2018): 407-416.

Fathi, Nima, Patrick McDaniel, Charles Forsberg, and Cassiano de Oliveira. "Power Cycle Assessment of Nuclear Systems, Providing Energy Storage for Low Carbon Grids." Journal of Nuclear Engineering and Radiation Science 4, No. 2 (2018): 020911.

Slocum, Alexander H., Daniel S. Codd, Jacopo Buongiorno, Charles Forsberg, Thomas McKrell, Jean-Christophe Nave, Costas N. Papanicolas et al. "Concentrated solar power on demand." Solar Energy 85, No. 7 (2011): 1519-1529.

* cited by examiner

MULTI-SOURCE SUSTAINABLE-RENEWABLE ENERGY HARVESTER

RELATED APPLICATIONS

This application claims priority to U.S. Provisional Application No. 63/146,475, filed on Feb. 5, 2021, which is incorporated herein in its entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

The estimated US energy consumption relies heavily on fossil fuels, about 78% of US primary energy, based on 2017 data. The share of solar energy in 2017 US energy consumption was just 0.76%. Nuclear energy, an important low-carbon baseline energy source, also has a relatively modest share, nominally 9.6% of the total US energy consumption. Although it is one of the most reliable/stable sources of energy with a small carbon footprint, the nuclear power industry is currently facing several challenges. First, nuclear generated electricity is not cost-competitive with other types of generation. Second, there is a diminished availability of cooling water to reject heat from large power plants. Third, the penetration of solar and wind generation systems into the electrical power market is producing significant fluctuations in the demand for nuclear generation.

It is also important to note that the largest consumers of fresh water in the United States are thermal power plants used to produce electricity. Approximately half of all fresh water consumed in the United States is used to absorb waste heat from thermal power plants. Typically, this water is either returned to the body of water from which it was extracted, or more commonly it is evaporated to the atmosphere in a cooling tower. To make matters even worse, water vapor is a potent greenhouse gas. Some nuclear power plants (Palo Verde in particular) are currently restricted from expansion by the lack of fresh water. Modest reductions of fresh water consumption in the future can be achieved by higher efficiency plants. However, with the growth of the electricity market and the finite amount of available fresh water, this is not likely to be a useful solution. Typically, combined cycle plants consume less fresh water per kilowatt of electricity produced than more traditional steam only plants.

Future advanced nuclear power plants can have a major impact on the consumption of fresh water by being constructed as Nuclear Air-Brayton Combined Cycle (NACC) plants or Nuclear Air Brayton Recuperated Cycle (NARC) plants. Both types require significantly less fresh water because they exhaust at least part of their waste heat directly to the atmosphere. Ultimately all waste heat is exhausted to the atmosphere, whether directly or through a cooling tower. But with the NACC and NARC plants significantly less water is consumed. In fact, with the simple recuperated plant, no fresh water is required, allowing it to be located far from any bodies of water. The ultimate heat sink for nuclear supplied power is the atmosphere, so a more direct method of dumping this heat would be useful. It is also possible that the low temperature waste heat could be pumped to a higher temperature by a heat pump.

The present invention provides several new combined cycles including the solar source as well as nuclear power plants to generate low carbon/zero carbon energy. Some aspects can be used for decarbonization as well by generation of hydrogen using the heat waste recovery from the cycle. Another important innovative technology presented in this invention is a small-scale heat sink which is used for dry cooling of the combined cycles. The cooling array composed of the new design heat sinks can be used in new energy devices especially fission batteries.

The initial application of the heat sink invention is in the cooling cycle of a fission battery or small modular reactor. An application for the present invention is as a fission battery. The concept of the fission battery (FB) is a "plug and play" nuclear reactor defined by multiple characteristics: economics enabled by factory fabrication of large numbers of identical units, easy installation and removal, unattended operation and highly reliable operations. FBs are designed to be a low-carbon replacement for fossil fuels by industrial and commercial companies that require energy to produce some product (manufactured goods, chemicals, education, data centers, ship transportation, etc.).

BRIEF SUMMARY OF THE INVENTION

In one embodiment, the present invention provides a method, approach, system, apparatus and solution that generates electricity from the removal heat of sustainable thermal cycles combined with a renewable thermal energy source. The present invention provides a unique approach to perform a dry cooling process which can be applied to reactors and, at the same time, generates electricity from the waste heat recovery loop which is boosted by the renewable source of energy.

In one embodiment, the apparatus includes a combined air Brayton cycle coupled with a renewable power cycle. The system may be divided into three independent thermal cycles and also includes heat exchangers. The combined thermal cycle provides low carbon energy to the electrical grid.

In another embodiment, the present invention provides new heat sink of new geometry, aspect ratio and materials which enhances the heat transfer and cooling process significantly while the corrosion is avoided.

In another embodiment, the present invention provides new heat sink of new geometry, aspect ratio and materials which enhances the heat transfer and cooling process significantly while the corrosion is avoided It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In one embodiment, the present invention provides a method, approach, system, apparatus and solution that uses solar-nuclear combined cycles to replace cooling towers with innovative solar towers. Solar towers can play the same role as the dry cooling tower but may also be used to generate electricity. The present invention decreases the water usage in an LWR (light-water reactor) or a pressurized water reactor (PWR). Also, it can be used for the secondary loop or the cooling loop of a power cycle.

Figure 1:
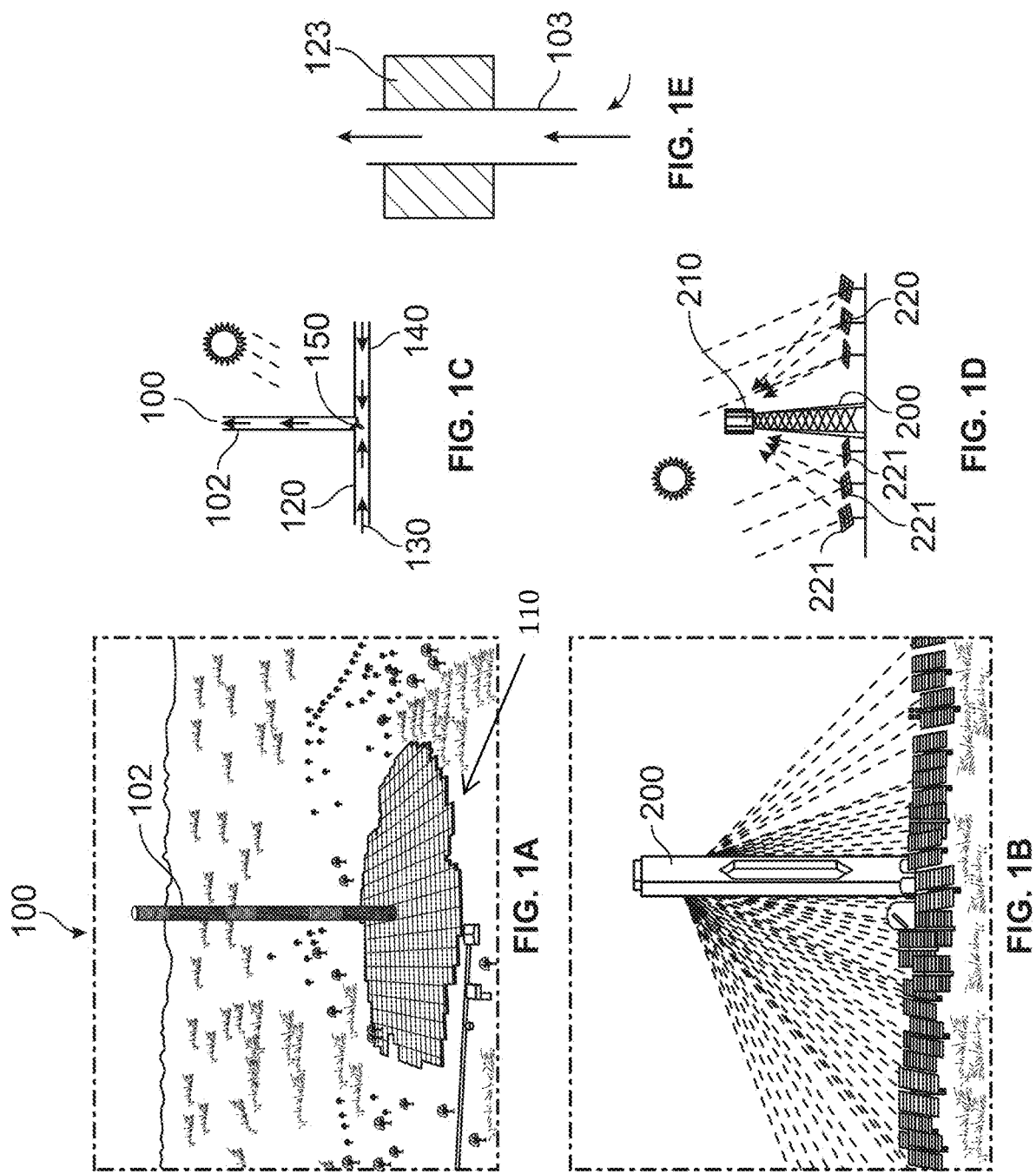
FIG. 1A illustrates a solar chimney power plant (SCPP) for an embodiment of the present invention.
FIG. 1B illustrates a concentrated solar tower (CST) for an embodiment of the present invention.
FIG. 1C is a schematic diagram of a solar chimney power plant for an embodiment of the present invention.
FIG. 1D is a schematic diagram of a CST for an embodiment of the present invention.
FIG. 1E shows the tower/receiver zone of the combined SCPP-CST for an embodiment of the present invention.

FIGS. 1A and 1C show a solar chimney power plant 100 (SCPP) of the present invention coupled to the condenser of a nuclear plant (not shown). This embodiment of the present reduces or eliminates the need to use a traditional circulating water system with the power plant.

Rather than dumping the waste heat rejected by a nuclear power plant to a wet cooling tower, the waste heat may be connected to a solar chimney power plant. This is particularly true in arid regions.

The SCPP of the present invention serves the function of a dry cooling tower but also produces additional electrical power. In a SCPP, the energy of buoyant hot air is converted into electrical energy.

As shown in FIGS. 1A and 1C, the SCPP, for an embodiment of the present invention, may include a collector 110 at ground level 140, covered with a transparent roof 120 that collects the solar radiation, heating the air inside and the ground underneath. A tall chimney 102 at the center of the collector is also provided along with a turbine 150 located at the base of the chimney. Turbine 150 is powered by heated air 130 that flows into and up through chimney 102.

A traditional approach to the chimney construction in combination with extreme heights required for efficient SCPP operation requires massive capital investment into the chimney. However, a low-cost, high-survivability alternative to rigid chimneys is the flexible, self-supporting, inflatable chimney disclosed in U.S. Pat. No. 10,006,443 B1, which is incorporate herein by reference in its entirety.

Figure 3:
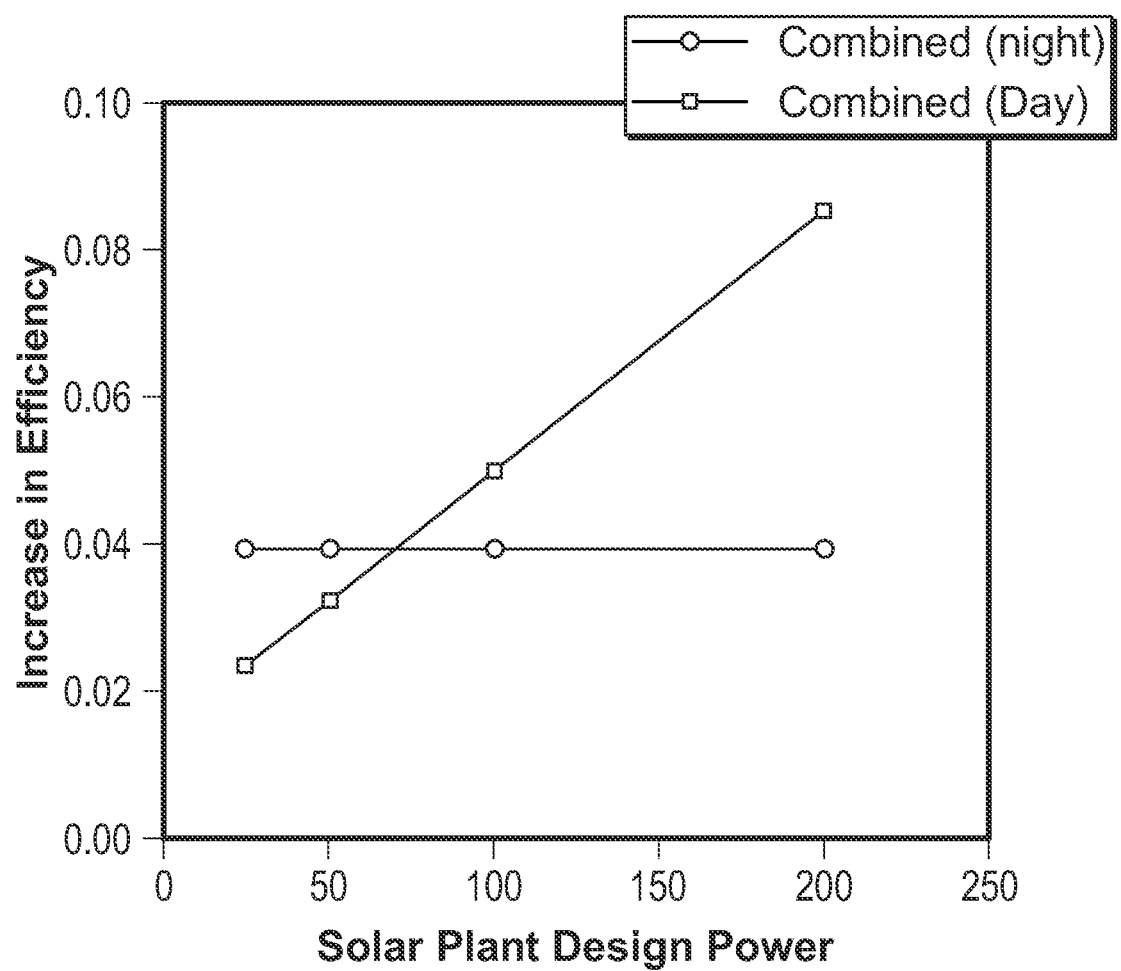
FIG. 3 is a graph showing the enhancement of the thermal efficiency of a nuclear power plant using the combined nuclear-solar cycle for an embodiment of the present invention.

The surplus heat from the nuclear cycle is used to increase the temperature of the air in the collector and therefore produce more electricity in the solar chimney power plant. The efficiency of the nuclear plant may be lowered due to the higher temperature of the condenser, but the loss can be made up by the increased power of the solar chimney. The heat provided by the sun is essentially free once the solar plant has been constructed and is not normally considered in the efficiency calculation. By applying the teachings of the present invention to a typical 1000 MW nuclear power plant with 35.3% thermal efficiency, there may be an increase in electrical energy of up to 41.4% as shown in FIG. 3.

Figure 2:
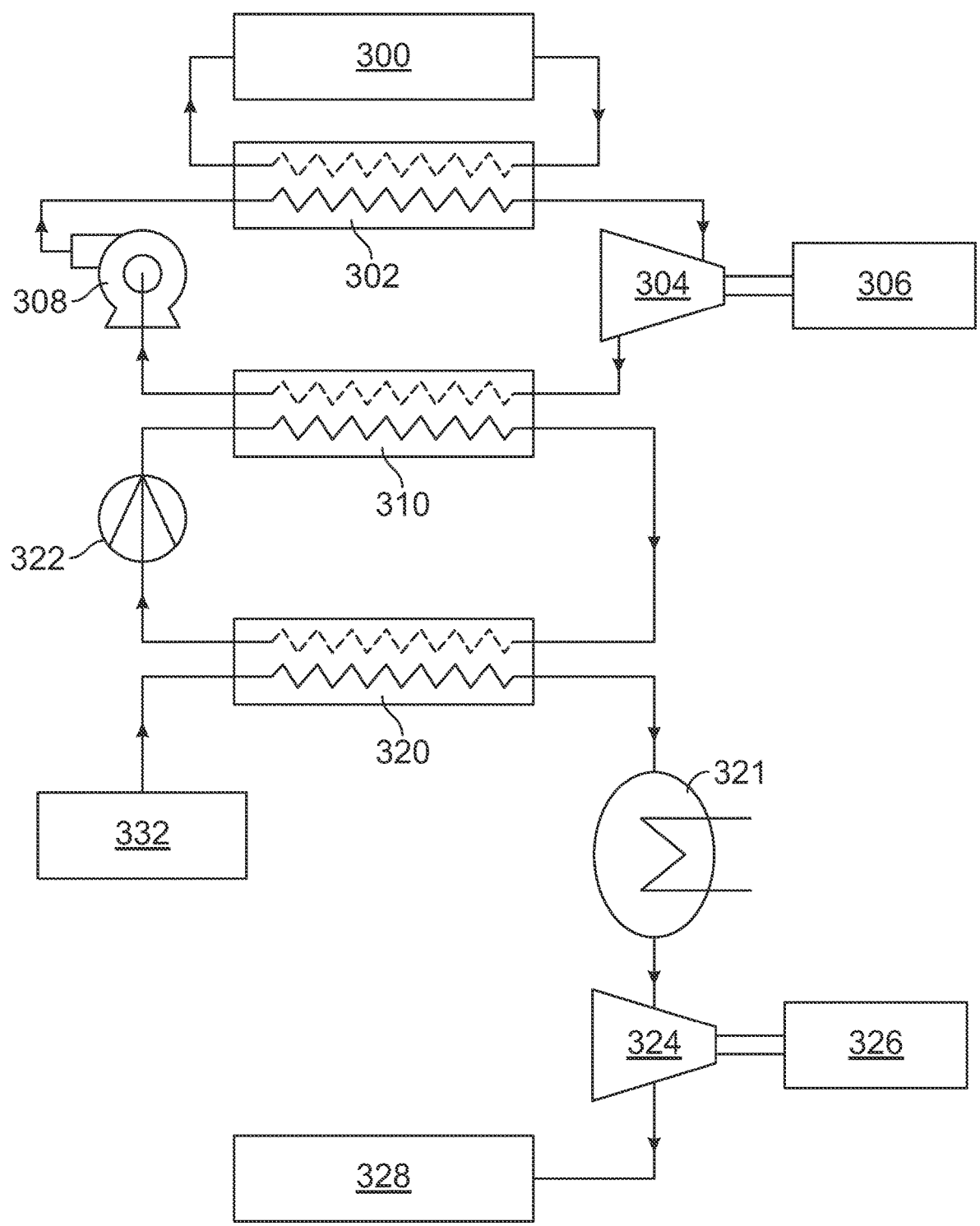
FIG. 2 illustrates the innovative combined cycle: a thermal/process diagram of the combined nuclear-SCPP cycle for an embodiment of the present invention.

For one preferred embodiment of the present invention, a combined nuclear-SCPP cycle, which does not include cooling tower, is shown in FIG. 2. The cycle is advantageous in environments where water is scarce, as the cooling tower is replaced by the solar chimney power plant utilizing the surplus heat from the available warm steam in the secondary loop of the reactor. There is essentially no consumption of water to remove the waste heat from the reactor power cycle.

As shown FIG. 2, the system includes heat source 300, which may be a nuclear reactor coupled to steam generator 302. Steam from generator 302 is used to power turbine 304 which is connected to generator 306.

Used steam exiting turbine 304 is fed into condenser 310 which turns the steam into water. The water is pumped back to steam generator 302 by pump 308. Water from condenser 310 is also fed to heat exchanger 320 by pump 322. Heat exchanger 320 is used to heat ambient air 332 that is fed into and mixed with heated air in solar collector 321. The heated air is used to power turbine 324 which in turn powers generator 326. A pressure reducer 328 may be used to release air into the tower.

In summary, waste heat recovery heat exchanger 320 gets the surplus heat from the cooling loop of the nuclear thermal cycle and transfers it to the open Air-Brayton cycle of the SCPP. The SCPP technology can be added to the mix of generation resources. The SCPP may enter the grid at several levels. The first would be to provide electricity locally for the power plant (pumps, fans, etc.). Secondly, it can be employed for direct use on the grid allowing the solar chimney to be used in various ways and fit in with the future framework of the grid.

In yet other aspects, the present invention, provides an innovative advanced combined nuclear-solar tower cycle configured to decrease the capital cost and increase the thermal efficiency of the whole system while decreasing water usage. Due to the lower temperature of available surplus/waste heat in LWRs and SMRs, combining the solar tower-nuclear is one of the key parameters. Adaption of waterless power production onto SMRs can be one of the outcomes of combined nuclear-solar tower energy cycles. As shown in FIGS. 1B and 1D, other embodiments of the present invention provide a concentrated solar tower 200 having a receiver 210 and helliostats 220 and 221, and solar chimney power plant (SCPP) to form a new combined solar tower which replaces a conventional cooling tower.

The tower zone of the combined SCPP-CST is shown in FIG. 1E.

FIG. 1E shows that, unlike the solar tower in FIG. 1D, tower 103 has a flow-through opening for the updraft. FIG. 1E depicts the tower part of the energy harvester where the chimney part (air flow domain in the middle) of solar chimney power plant combined with the tower part of the concentrated solar tower together. The embodiment has the solar chimney in the middle to have the updraft air (solar chimney power plant) while around the external surface of the cylindrical wall hollow central receiver 123 is provided (concentrated solar tower).

As is also shown, in some embodiments, the SCPP may be covered by heliostats 220 and 221. This hybrid solar tower will generate electricity three times greater than our previous design of solar-nuclear combined cycle. Emphasis is placed on coupling the LWR cycles to this combined solar tower technologies to replace the cooling tower.

Figure 4:
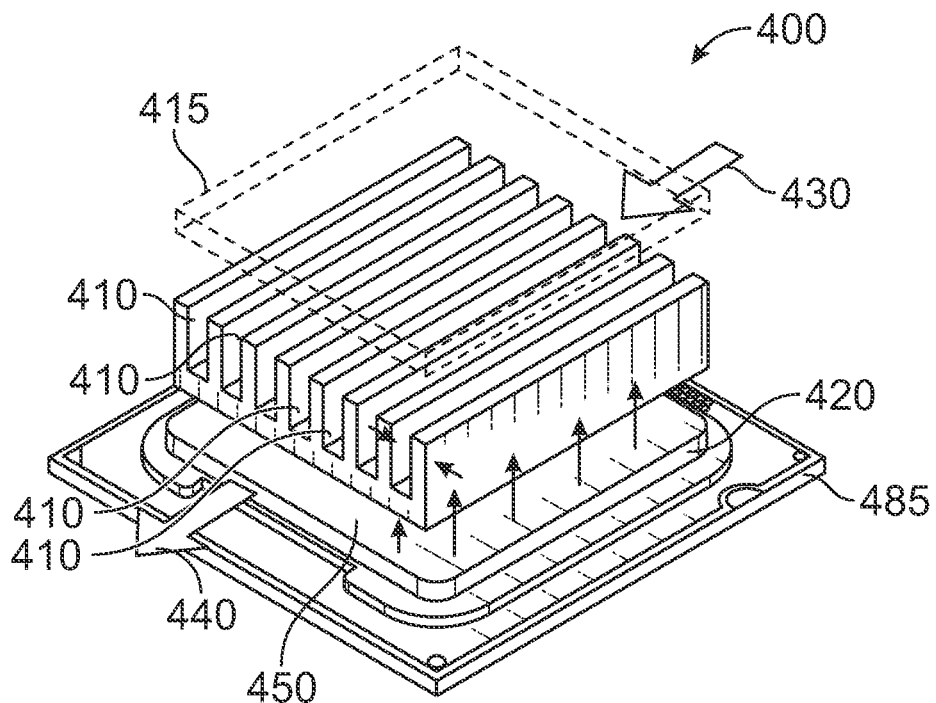
FIG. 4 shows how a typical heat sink can be applied in micro-electro cooling for an embodiment of the present invention.
Figure 5:
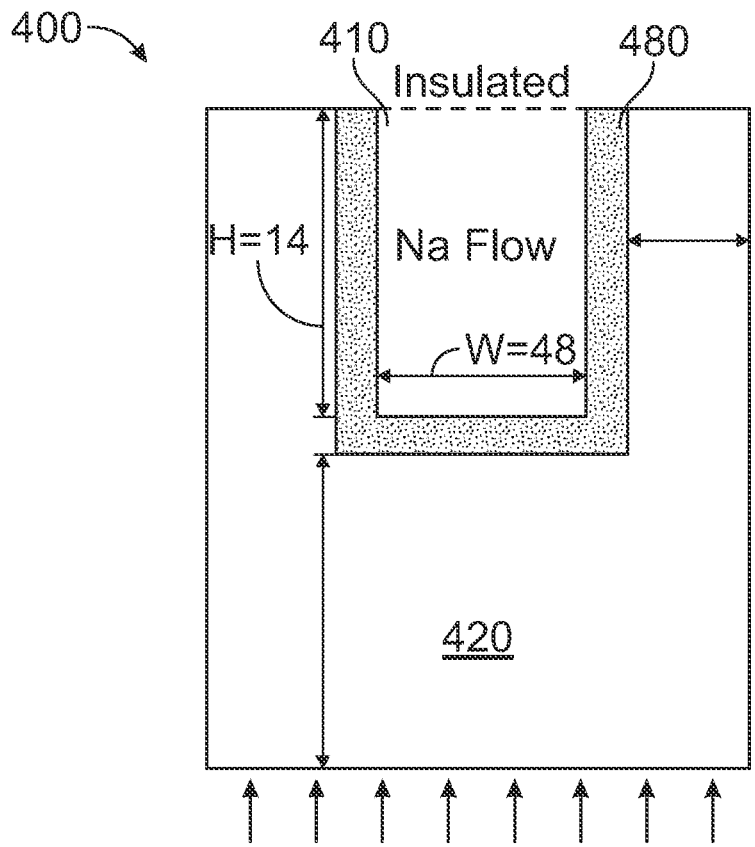
FIG. 5 is a schematic front view illustrates a heat sink for an embodiment of the present invention.

In other aspects, as shown in FIGS. 4 and 5, the present invention a concerns milli-scale and micro-scale heat exchanger 400 comprising a plurality of channels 410 which can also be used in fission batteries (FBs) and microreactors. In one aspect, heat exchanger 400 may be assembled into array and used with he energy harvesters described above, FIG. 4 shows a single unit of the array which is a new type of micro-/mill channel using molten salt as coolant.

A typical straight miniature heat sink consists of several parallel small-scale channels 410 fabricated on top of a base solid block 420 along with cover plate 415. Heat sink 400 includes an inlet side 430 for cooler fluid and outlet side 440 wherein heated fluid exits. Heat transfer takes place at a hot surface 450 which is located in between the outlets to remove heat from device 485 which may be a chipset Therefore, dissipated heat first diffuses within base 420, which may be a solid block, and eventually is transferred to the coolant flowing within channels of the heat sink. This is a conjugate heat transfer phenomenon with temperature and heat flux continuity boundary conditions at the solid fluid interfaces at the heat sink channel walls. Fluid flow and heat transfer phenomena within small-scale heat sinks have been investigated extensively by researchers during the last two decades. Single phase forced convection of conventional coolants such as water, ethanol and dielectric liquids has been widely investigated in miniature heat sinks due to their relatively high specific heat capacities. Moreover, these liquids are compatible with most materials used to fabricate compact and micro scale heat exchangers which can be employed in small-scale reactors and FBs.

Although numerous above-mentioned research activities have been done on flow and heat transfer of liquid metals in large scale pipes, channels and heat exchangers, a few number of researches are available for forced convection heat transfer of liquid metals in small-scale heat sinks with hydraulic diameter less than 5 mm. Reported experimental values of Nusselt numbers for the laminar flow was a weak function of Reynolds number while they were 50% lower than the theoretical fully developed laminar Nusselt numbers. Reported results showed that EGaIn lead to the lowest pressure loss while EGaInSn required the highest pumping power. The Gain was observed to produce the highest heat transfer rate among all the investigated liquid metals.

Despite the very high boiling points and high thermal conductivity values, liquid metals such as Na are corrosive and react with most commonly used high thermal conductivity solid materials used to fabricate small-scale heat sinks such as copper. To address this problem, an embodiment of the present invention, adds a thin layer of corrosive resistance material 480 to the walls of copper-based miniature heat sinks. In a preferred embodiment, copper-based miniature heat sinks are provided having thin layers of SiC, SS-316, Inconel 718 and Refractory High Entropy Alloy (RHEA) cladded on the heat sink walls.

Turbulent flows and heat transfer of liquid sodium (Na) within a copper-based cladded minichannel heat sinks have been investigated numerically. The investigated minichannel heat sink had the aspect ratio of 0.29, length of 800 mm and hydraulic diameter of 21.7 mm. Cladding layers with thickness range of 0.25 mm to 4.5 mm and thermal conductivity range of 4 to 17 W/mK were applied to the minichannel walls to protect the copper from corrosive liquid sodium. The thermal conductivity range was chosen such that the cladding layer resembled SiC, SS-316, RHEA and Inconel 718. The obtained results showed that the optimum cladding layer thickness is about 1 mm. This optimum cladding layer thickness provides sufficient resistance to the corrosive Na while illustrating highest cladding layer efficiency at thermal conductivity of 17 W/mK.

Figure 6:
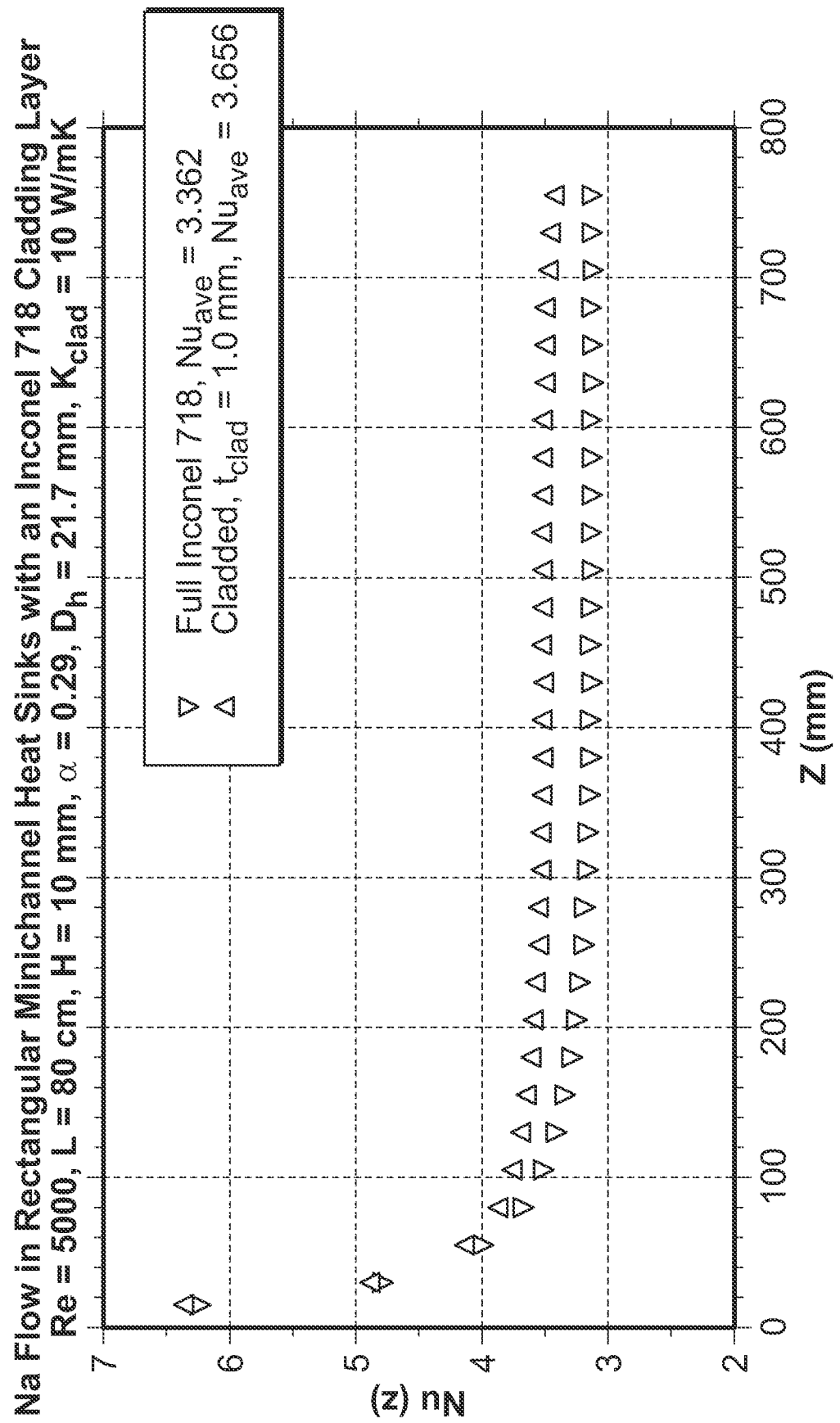
FIG. 6 shows the results of heat transfer enhancement of the cooling using an embodiment of the present invention focused on cladded design of milli-scale and micro-scale heat sinks. Local Nusselt numbers for Na flow at Reynolds number of 5,000 within a milli-channel with a 1 mm of Inconel 718 cladding layer with thermal conductivity of 10 W/mK.
Figure 7:
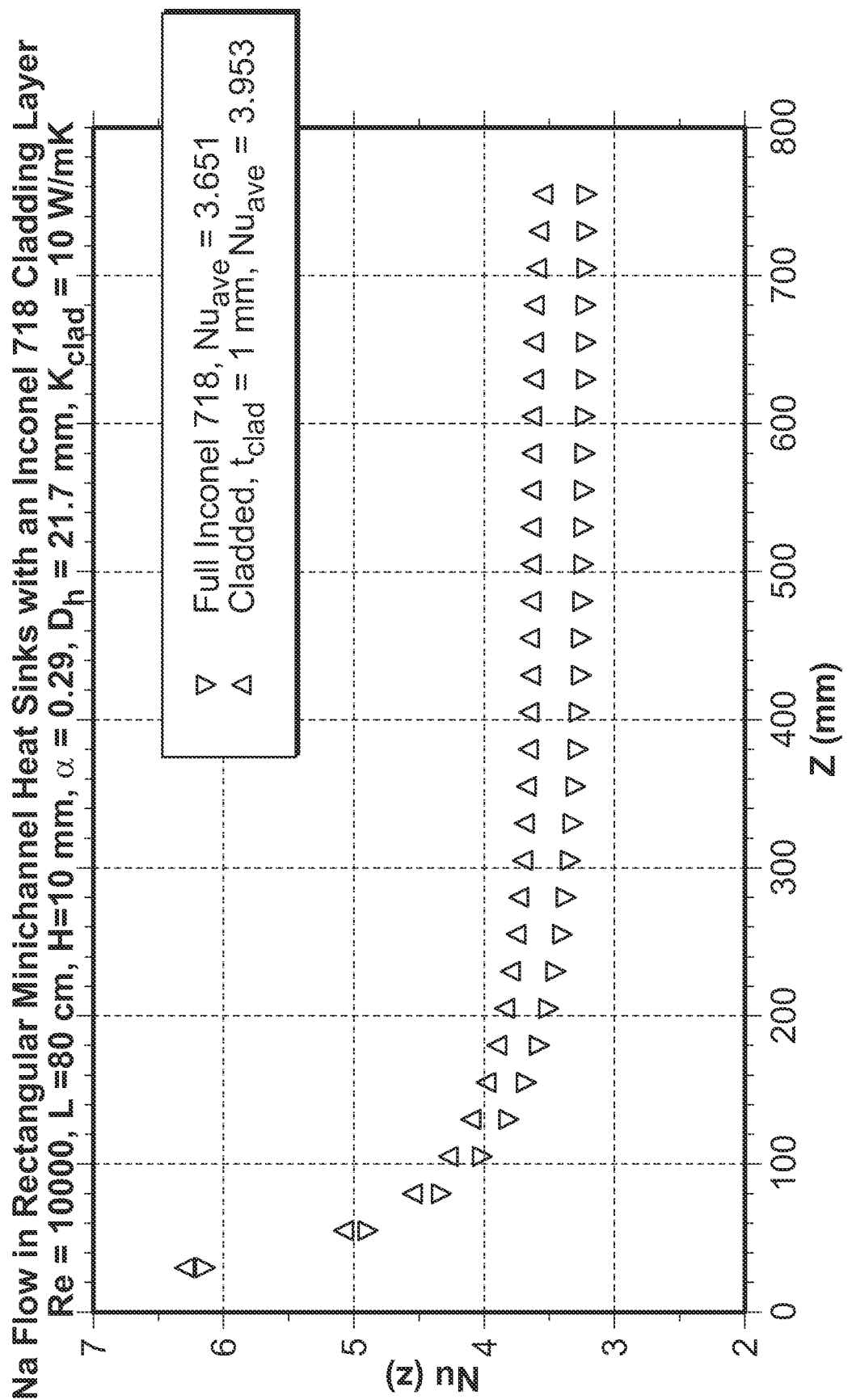
FIG. 7 presents the enhancement in heat transfer using an embodiment of the present invention on a cladded milli-scale or micro-scale heat sink. : Local Nusselt numbers for Na flow at Reynolds number of 10,000 within a minichannel with a 1 mm of Inconel 718 cladding layer with thermal conductivity of 10 W/mK.

In comparison with a similar minichannel heat sink made of the cladding layer material, 12% enhancement was observed in the thermal performance of the investigated cladded minichannel heat sink. Inconel 718 and RHEA are more expensive than the copper and therefore the concept of copper-based cladded minichannel heat sink proposed and investigated in this research can reduce total cost in real world applications of miniature heat sinks with high working temperatures and high heat dissipation rates (see FIGS. 6 and 7).

Liquid metals such as Na and NaK provide high thermal conductivity of 79 and 25 W/mK respectively. They also have very high boiling points of up to 900° C. These thermophysical properties make Na and NaK favorable coolants in applications involving high working temperatures and high heat dissipation rates such as laser diodes, fission batteries, MW-class gyrotron resonators, and solar power plants, Miniature heat sinks with hydraulic diameters of less than 5 in. m are small and require a minimum amount of coolant to operate. Therefore, they can be used in applications where space and weight are two main design constraints. Numerical simulations were performed in this work, to study Na and NaK liquid metals flow and heat transfer within small-scale heat sinks with different geometries for hydraulic diameters less than 5 mm. Validation of the implemented numerical method is verified against available experimental data. Experimental data on the local Nusselt numbers of NaK turbulent flow within a uniformly heated tube were compared with the obtained Numerical results. Fairly good agreement was observed between numerical results and experimental data which confirmed the reliability of the implemented numerical approach. Numerical simulations were then extended to obtain local and average Nusselt numbers of Na and NaK flows in a miniature heat sink with rectangular and pentagonal cross-sections at Reynolds numbers of up to 9000. It was observed that at the same surface area to volume ratio of 1200 $m^{-1}$, the rectangular miniature heat sink provided an almost 280% higher heat transfer rate than the pentagonal heat sink for both Na and NaK. Despite the larger thermal conductivity of Na in comparison with NaK (79 W/mK to 25 W/mK), the obtained convective heat transfer coefficients for NaK flows were 20% higher than the Na flows for pentagonal heat sink at the same flow Peclet number. In the investigated heat sink 400 having rectangular channels 410, it was observed that the obtained average Nusselt numbers for Na and NaK differed slightly, and they were almost identical at the same Peclet number. For Na and NaK, the ratio of thermal-hydraulic performances between rectangular and pentagonal heat sinks was observed to increase with Reynolds number in the laminar flow regime.

Low maintenance cost, small size and dimensions, as well as high convective heat transfer coefficients, make micro-scale heat sinks an efficient and reliable cooling solution for applications with high heat dissipation rates. Despite these advantages, the large pressure drop that occurs within microscale heat sinks has restricted their utilization. Slip at the walls of microchannels has been applied in this invention to reduce friction factor up to 30%, depending on the hydraulic diameter of the microchannel. Numerical investigations are conducted to comprehensively investigate the effect of slip at walls on friction factor and Nusselt number of liquid flows in micro-scale heat sinks. At the same mass flow rate and inlet Reynolds number, obtained results suggest that slip length on the order of 2 μm enhances the overall thermal hydraulic performance of micro heat sinks by almost 6% in comparison with no-slip boundary condition. 4% increase is observed in channel average Nusselt number while pumping power reduces by 8% in comparison with no-slip boundary condition.

Induced slip at the microchannel walls tends to reduce the pressure drop while enhancing the heat transfer rate. Water slips at the microchannel walls, enhancing the convective heat transfer rate, which leads to higher Nusselt numbers. For example, at Reynolds number of 1000, the average Nusselt number increases from 9.04 at slip length of $\beta=0$ (no-slip) to 9.39 at $\beta=2$ μm. On the other hand, the pressure drops along the microchannel decreases from 19.77 to 18.3 kPa, respectively. Overall, a small, induced slip on the order of 2 μm can enhance the hydrodynamic arid thermal performance of the investigated microchannel heat sink by almost 8% and 4%, respectively.

Figure 8:
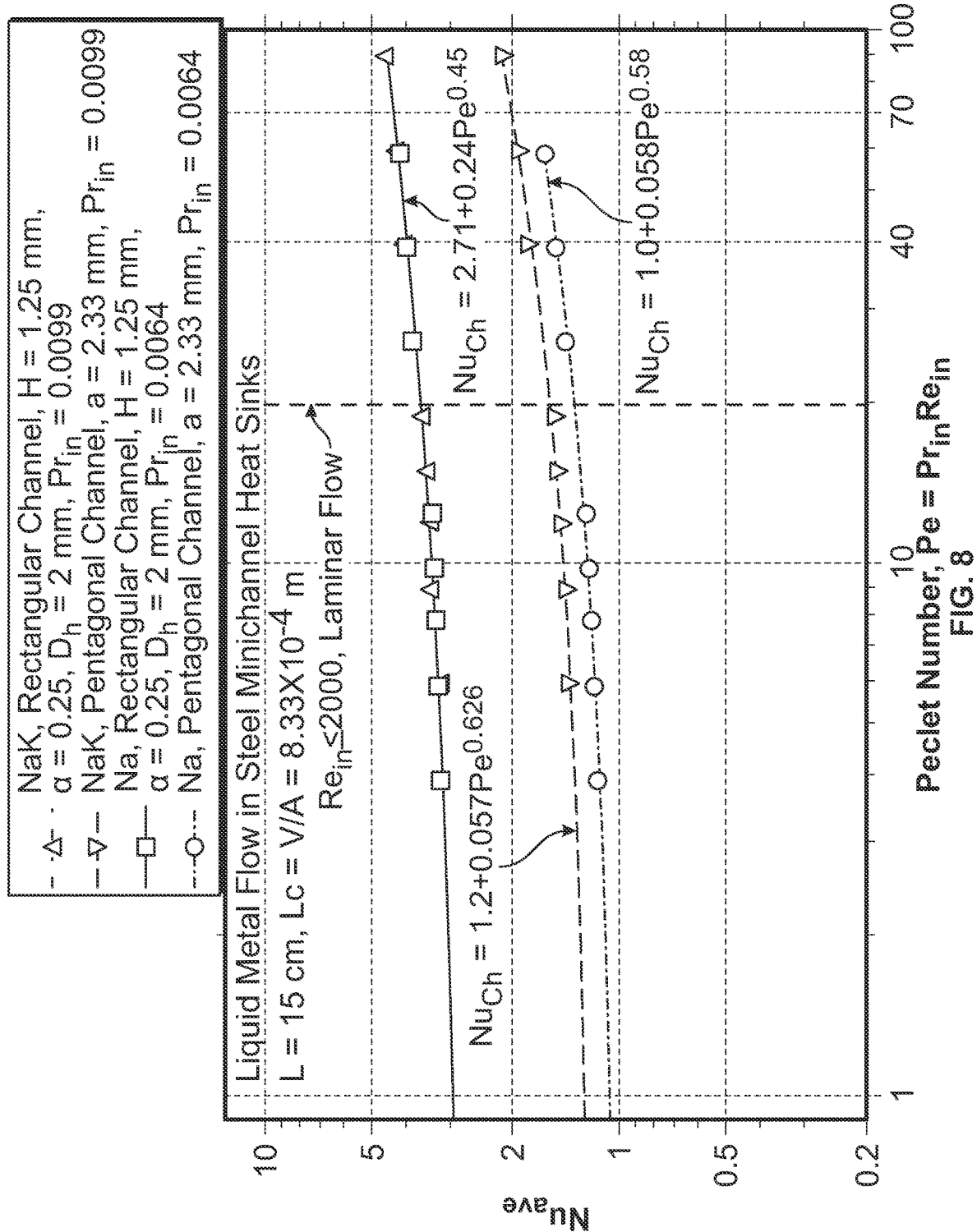
FIG. 8 shows the heat transfer enhancement results using a geometrical design of a heat sinks for Na (Sodium) and NaK (Sodium Potassium) coolants for an embodiment of the present invention.
Figure 9:
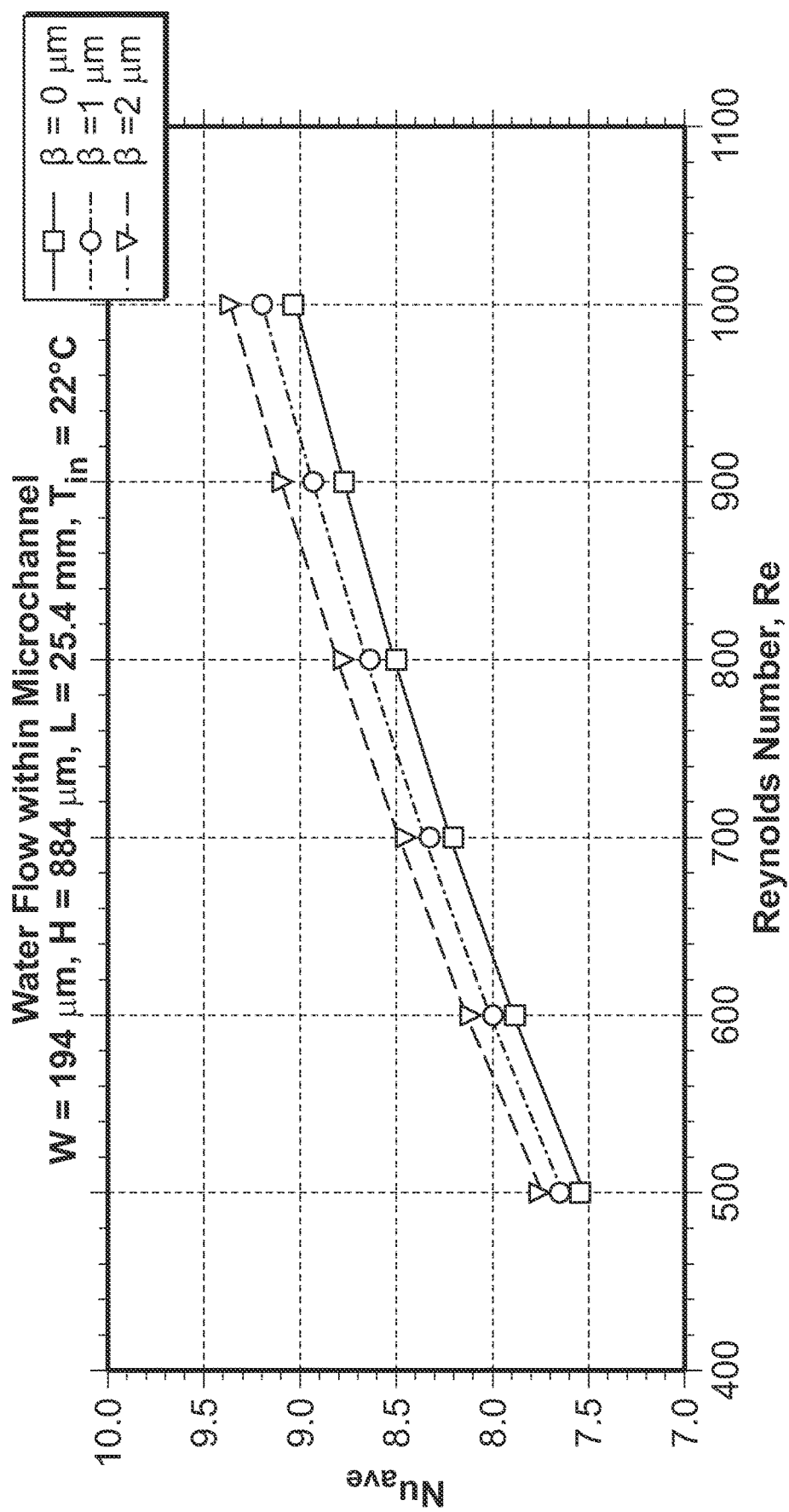
FIG. 9 shows the thermal cooling improvement of a boundary condition and using slippery surface on the micro-heat sink for an embodiment of the present invention.
Figure 10:
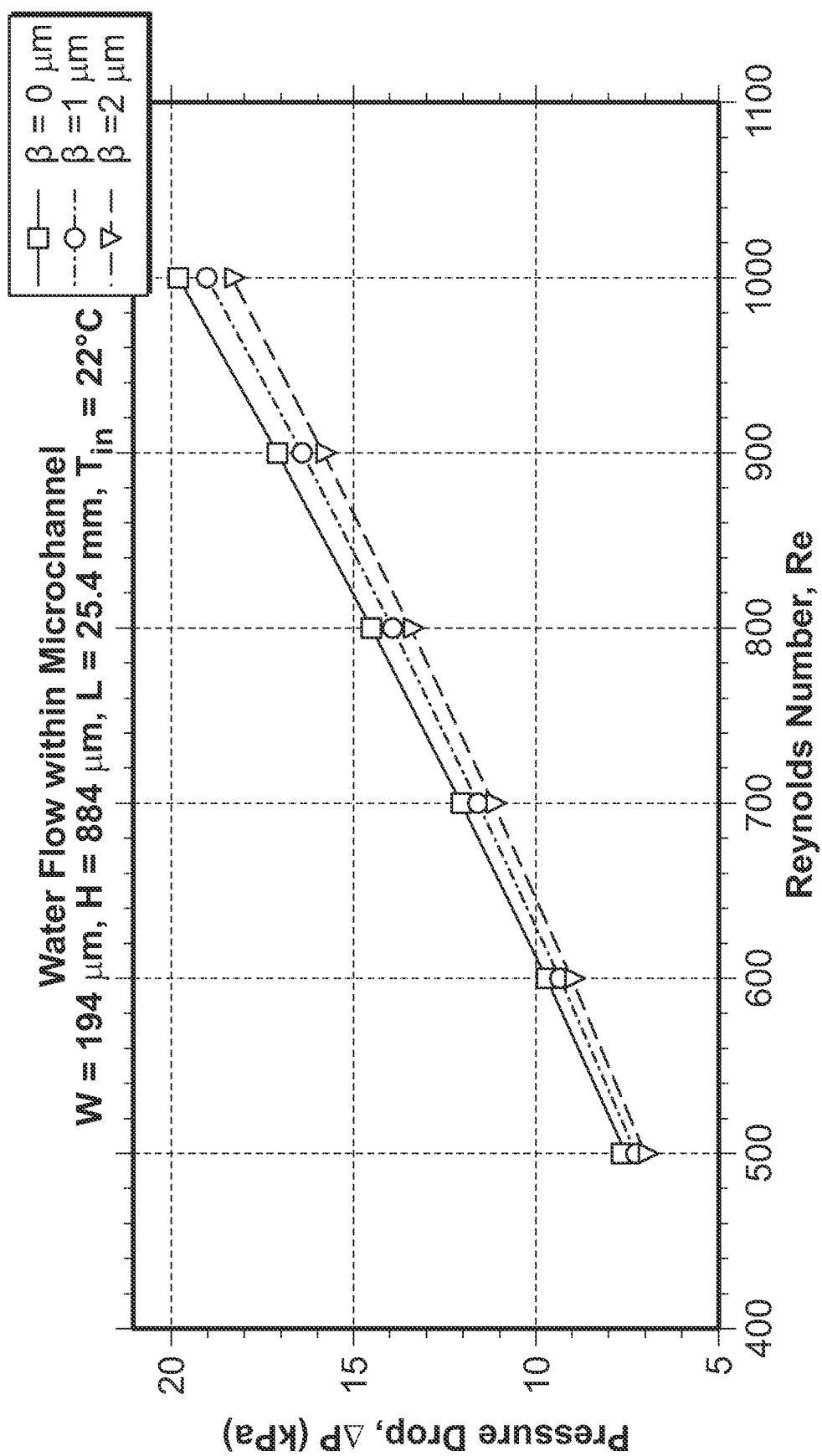
FIG. 10 shows the pressure drop reduction using the boundary condition for an embodiment of the present invention wherein micro-heat sinks are used in the combined cycle cooling loop.

The microchannel wall temperature decreases with increased slip length. At a constant applied heat flux, higher Reynolds numbers are achieved in microchannels with higher slip lengths. At a constant hydraulic diameter and a constant applied heat flux, higher Nusselt numbers result in higher convective heat transfer coefficients. A higher heat transfer rate at a constant applied heat flux leads to a lower wall temperature in the miniature heat sink (see FIGS. 8 and 9).

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A solar chimney power plant comprising:
   a collector, said collector covered with a transparent roof that collects solar radiation;
   a chimney having a base and top, said base of said chimney located at the center of said collector;
   a turbine located in said base;
   said collector in communication with said chimney to allow air heated in said collector to flow into and up through said chimney to drive said turbine;
   a heat exchanger, said heat exchanger configured to heat ambient air that is fed into and mixed with heated air in said collector;
   said heat exchanger includes a plurality of heat sinks, each of said heat sinks comprised of parallel channels, said parallel channels located between a base and cover plate;
   each of said heat sinks inlet side for cooler fluid and an outlet side where heated fluid exits said heat sink;
   said parallel channels include a cladding made of an alloy; and
   said solar chimney further adapted to use heat from a nuclear power plant to increase the temperature of the air in said collector to drive said turbine.

* * * * *